Dec. 29, 1942.     W. I. JONES     2,306,952
ROTARY FASTENER DEVICE AND INSTALLATION OF THE SAME
Filed Jan. 16, 1942
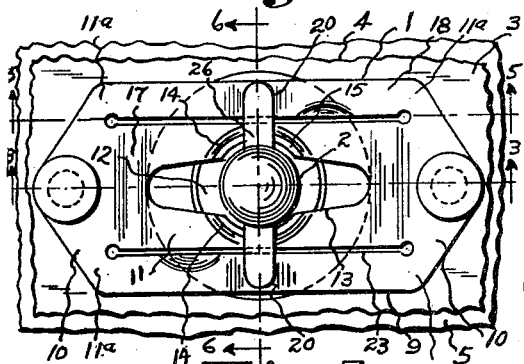
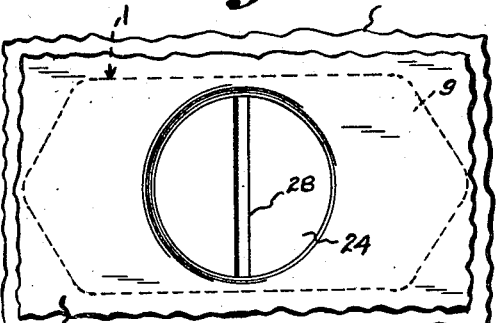
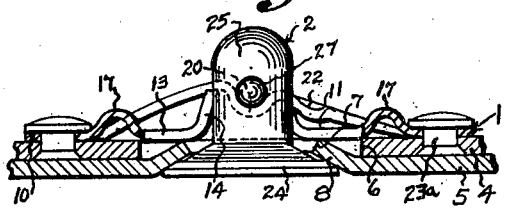
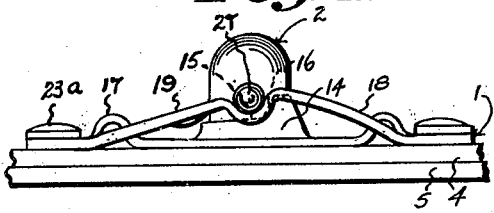
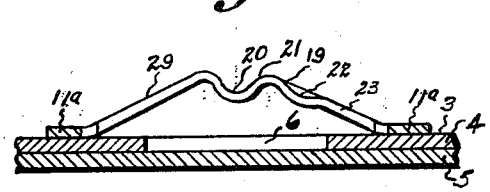
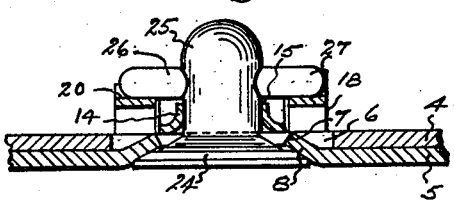
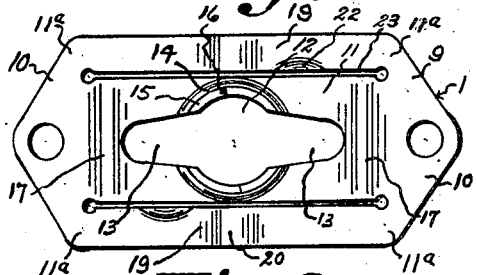
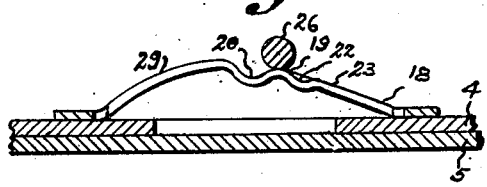
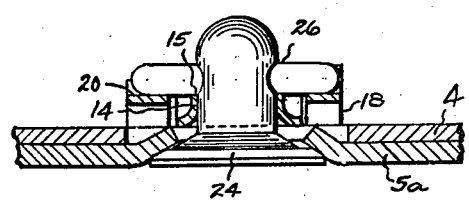
Inventor:
Walter I. Jones.
By John Todd
Att'y.

Patented Dec. 29, 1942

2,306,952

UNITED STATES PATENT OFFICE 2,306,952

ROTARY FASTENER DEVICE AND INSTALLATION OF THE SAME

Walter I. Jones, Belmont, Mass., assignor to United-Carr Fastener Corporation, Cambridge, Mass., a corporation of Massachusetts Application January 16, 1942, Serial No. 427,010

9 Claims. (Cl. 24—221)

This invention aims to provide improvements in fastener devices for securing together two or more members preferably plate-like. The device is of the so-called rotary operative type and adapted to draw the plate-like members together on rotation of one part of the device relative to the other.

The chief object of my invention is the provision of a fastener device of simple and inexpensive construction having an improved socket member formed from a single piece of sheet metal and adapted to cooperate with a stud member in a manner to draw the plate-like members firmly together. My improved socket member is of the type now being used in connection with high-speed aircraft and provides a slight take-up for carrying thicknesses of the plates to be secured together, as well as a rigid supporting element which may cooperate with a lateral projection of the stud element to prevent any appreciable movement of the plates away from each other flatwise.

Other uses and objects of my invention will be apparent from inspection of the drawing and specification hereinbelow set forth.

In the drawing which illustrates preferred embodiments of my invention:

Fig. 1 is a top plan view showing an installation including two plate members secured together by means of my improved fastener device;

Fig. 2 is a rear view of the installation shown in Fig. 1;

Fig. 3 is a section taken on the line 3—3 of Fig. 1;

Fig. 4 is a side elevation of the installation shown in Fig. 1;

Fig. 5 is a section taken on the line 5—5 of Fig. 1, the stud pin being omitted;

Fig. 6 is a section taken on the line 6—6 of Fig. 1;

Fig. 7 is a top plan view of the socket member forming a part of the fastener device;

Fig. 8 is a section similar to that of Fig. 5 and showing the manner in which laterally projecting elements of the rotary member are cammed into engagement with the spring elements of the socket member; and Fig. 9 is a section similar to Fig. 6 and showing the manner in which the fastener device is operable to secure plates having a greater combined thickness than in the preferred installation illustrated in Figs. 1–6.

Referring to the drawing, my preferred fastener device comprises a socket member 1 and a rotary unit 2. The socket unit 1 is secured on an inner surface 3 of a flat supporting plate 4 and the rotary unit 2 is carried by a flat supporting plate 5. The plate 4 has an aperture 6 adapted to receive a portion of the stud unit 2 and the plate 5 has an opening 7 through which the stud unit 2 projects. The opening 7 is preferably surrounded by a frusto-conical embossment 8 (Fig. 3) which is received within the opening 6 of the plate 4 when the plates are in flush abutting relation.

Referring in detail to the construction of the socket member 1, the member is preferably constructed from a single piece of spring metal. The socket in my preferred form has a base in the form of an elongated plate-like element 9. The element 9 provides end portions 10—10 at its longitudinal ends and a connecting portion 11 joining the end portions 10—10. The end portions 10 are of greater width than the connecting portion 11 so that each end portion provides a pair of elements 11ª—11ª which projects laterally on opposite sides of the connecting element 11. The connecting element 11 has a central opening 12 and narrow extensions 13 of the opening 12 are formed on opposite sides of the same so as to extend along the line of the longitudinal axis of the plate 9. Locking elements in the form of arcuate wall portions 14 are provided adjacent the opening 12. Each of the wall portions projects above the normal plane of the connecting portion 11 and extends from adjacent one of the narrow extensions 13 to adjacent the other. Each of the wall portions 14 has an upper edge portion 15 which operates under certain conditions to support a pin element forming a part of the stud unit and the edge 15 terminates in an inclined portion 16 which may act as a stop. The connecting portion 11 provides a pair of folds 17, each of which is disposed intermediate the end of one of the narrow extensions 13 and the respective adjacent end portion 10. As a result of the folds 17, the end portions 10 are foreshortened in the direction of the central opening 12, for a purpose hereinbelow set forth.

The yieldable means which are engageable with the stud unit to hold the same in locking engagement with the socket member are preferably formed as an integral part of the socket unit. The yieldable means in my present invention are in the form of a pair of narrow spring elements 18 which are disposed on opposite sides of the connecting portion 11 and extend in generally parallel relation to the longitudinal axis of the plate element 9. Each of the spring elements is generally bowed in form so as to project above the normal plane of the plate 9 and the ends of each spring element are integrally joined to those lateral projections 11ª which are disposed on the same side of the connecting portion 11. The bowed formation of the spring elements 18 is brought about as a result of the folds 17 which permit the end portions 10 to be foreshortened toward each other. Each of the spring elements 18 provides an inclined cam surface 19 and a detent or locking seat 20 at an end of the same. An abrupt surface 21 is provided on the opposite side of the locking seat 20 from the inclined surface 19 which acts as a stop. A depressed portion 22 is preferably provided at the inner edge 23 of each of the spring elements and positioned with relation to the respective cam surface 19 so as to effect a lead for guiding co-engaging elements of the stud unit into engagement with the respective cam surfaces 19 when the stud unit is rotated. The socket member is preferably secured to the plate 4 by the rivets 23ª which extend through openings of the plate 9 and plate 4 and are headed over on opposite sides of the parts, as shown in Fig. 3.

The rotary unit 2 comprises a head portion 24 which is larger in diameter than the opening 7 of the plate 5 and a shank 25 which is smaller in diameter than the aperture 6 of the plate 4 and the opening 12 of the socket member so as to project through the same. A pin 26 is driven or otherwise secured in an aperture of the shank 25 so that opposite ends 27 of the pin extend laterally beyond the sides of the shank in a direction normal to the axis of the shank. The pin 26 is preferably assembled with the shank 25 after the shank has been extended through the opening 7 of the plate member 5 and as the length of the pin 26 is greater than the diameter of the opening 7 the pin cooperates with the base 24 to hold the stud unit in assembly with the plate 5. The head 24 preferably has a slot 28 (Fig. 2) to receive a tool or suitable implement by which the stud unit may be rotated.

In fastening the plate 5 to the plate 4 the plate 5 is moved toward the plate 4 to dispose the embossment 8 within the aperture 6. When the parts are in this relation, the shank 25 extends through the opening 12 of the plate 9 and the pin ends 27 are in registration with the lateral extensions 13. Thereafter, the rotary member is turned in a counter-clockwise direction (viewing Fig. 1) causing the pin ends 27 to ride up over the cam surfaces 19 of the spring element 18 to engage within the detents 20, as shown in Fig. 4. It will be seen from inspection of Fig. 8 that as each of the pin ends rides up the cam surface 19, the portion 29 of the spring element on the opposite side of the detent 20 from the cam surface 19 tends to bow upwardly, thereby providing the tension necessary to effect a good snap fastener engagement between the parts. As the stud unit is rotated, the plates 4 and 5 are drawn tightly together and the relation of the combined thicknesses of the plates 4 and 5 to the distance between the head 24 of the stud unit and the pin 26 is preferably such that the bottoms of the detents 20 support the pin ends 27 at points slightly above the locking edges 15 of the walls 14, as most clearly shown in Fig. 6. Furthermore, the construction of my improved socket member offers a rigid support for the pin ends in case the plates 4 and 5 are forced flatwise away from each other, as a result of the flow of air therebetween, due to the fact that if the spring elements are pulled toward the plate 4 for any appreciable distance the edges 15 will operate to support the pin 26. Thus, the greatest possible distance of flatwise movement between the plates 4 and 5 can be no greater than the distance between the locking edges 15 of the walls 14 and the lower surface of the pin 26. As this distance preferably only amounts to a few thousandths of an inch no great damage is done should the plates 4 and 5 separate to that extent.

A further advantage of my improved socket member is illustrated in Fig. 9, in which the parts of the installation are identical with those illustrated in Figs. 1–6 inclusive, except that the lower plate 5ª is of slightly thicker material than the plate 5 of my preferred installation. The increased combined thicknesses which the plates 4 and 5ª present cause the spring elements 18 to be pulled nearer the plate 4 to effect fastener engagement of the stud and socket members with the result that the pin 26 may rest on the locking edges 15 substantially in the manner illustrated in Fig. 9. Thus, the construction of my socket member provides a take-up which permits slight variations in the combined thicknesses of the plate members to be secured.

Although I have illustrated and described preferred embodiments of my invention, I do not wish to be limited thereby because the scope of my invention is best defined by the following claims.

I claim:

1. In a fastener device of the rotary operative type, a plurality of apertured members to be fastened together, a one-piece socket member adapted to be secured to one of said apertured members, said socket member having an aperture and a spring element, a rotary operative stud having a head bearing against the outer surface of one apertured member and a shank extending through all of said apertured members and said socket member, a crosspin assembled with said shank, a portion of said pin being adapted to ride up on said spring element so as to be supported by said spring element in interlocking relation therewith when the rotary member is turned to fastening position, and said socket member having a rigid locking element adjacent said aperture thereof and independent of said spring element so as to be operable to support said crosspin to prevent any appreciable movement of the apertured members away from each other.

2. In a fastener device of the rotary operative type, a plurality of apertured members to be fastened together, a one-piece socket member adapted to be secured to one of said apertured members, said socket member including a plate-like element having an aperture and a spring element integrally joined to said plate-like element, said spring element being positioned in predetermined relation to said aperture of said plate element and projecting above the plane of said plate element, a rotary operative stud having a head bearing against the outer surface of one apertured member and a shank extending through all of said apertured members and said aperture of said plate element of said socket, a crosspin assembled with said shank, a portion of said pin being adapted to ride up on said spring element so as to be supported by said spring element in interlocking relation therewith when said rotary member is turned to fastened position, and said plate element having a rigid locking element adjacent said aperture thereof operable to support said crosspin to prevent any appreciable movement of the apertured members away from each other.

3. In a fastener device of the rotary operative type, a plurality of apertured members to be fastened together, a one-piece socket member adapted to be secured to one of said apertured members, said socket including a plate-like element having an aperture and a spring element integrally joined to said plate element, said spring being relatively narrow and providing a cam surface and a locking seat, a rotary operative stud having a head bearing against the outer surface of one apertured member and a shank extending through all of said apertured members and said aperture of said plate element of said socket, a crosspin assembled with said shank, a portion of said pin being adapted to ride up said cam of said spring element so as to be supported by said spring element in interlocking relation therewith within said seat when said rotary member is turned to fastened position, and said plate member having a rigid locking element adjacent said aperture thereof operable to support said crosspin to prevent any appreciable movement of the apertured members away from each other.

4. In a fastener device of the rotary operative type, a plurality of apertured members to be fastened together, a one-piece socket member adapted to be secured to one of said apertured members, said socket including a plate-like element having an aperture and a narrow spring element integrally joined to said plate element at each of opposed ends of said spring, said spring element having a cam surface and a locking seat intermediate its ends, a rotary operative stud having a head bearing against the outer surface of one apertured member and a shank extending through all of said apertured members and said aperture of said plate element of said socket, a crosspin assembled with said shank, a portion of said pin being adapted to ride up said cam of said spring element so as to be supported by said spring element in interlocking relation therewith within said seat when said rotary member is turned to fastened position, and said plate member having a rigid locking element adjacent said aperture thereof operable to support said crosspin to prevent any appreciable movement of the apertured members away from each other.

5. In a fastener device of the rotary operative type, a plurality of apertured members to be fastened together, a one-piece socket member adapted to be secured to one of said apertured members, said socket including a plate-like element having an elongated recess and a narrow elongated spring element integrally joined at at least one of its ends to said plate element, said spring element being disposed above the general plane of said plate element and extending in parallel relation to the major axis of said elongated recess laterally and to one side of said elongated recess, a rotary operative stud having a head bearing against the outer surface of one apertured member and a shank extending through all of said apertured members and said recess of said plate element, a crosspin assembled with said shank, a portion of said pin being adapted to ride up on said spring element so as to be supported by said spring element in interlocking relation therewith when said rotary member is turned to fastened position, and said plate element having a rigid locking element adjacent said recess thereof and independent of said spring element so as to be operable to support said crosspin to prevent any appreciable movement of the apertured members away from each other.

6. In a fastener device of the rotary operative type, a plurality of apertured members to be fastened together, a one-piece socket member adapted to be secured to one of said apertured members, said socket including a plate-like member having an elongated recess and narrow elongated spring elements each of which is integrally joined at its opposed ends to said plate element, said spring elements being disposed above the general plane of said plate element and extending in parallel relation to the major axis of said elongated recess on opposed sides of the same, a rotary operative stud having a head bearing against the outer surface of one apertured member and a shank extending through all of said apertured members and said recess of said plate element, a crosspin assembled with said shank, said pin having portions adapted to ride up on said spring elements so as to be supported by said spring elements in interlocking relation therewith when said rotary member is turned to fastened position, and said plate element having a rigid locking element projecting above the plane of said plate adjacent said recess thereof, said locking element being operable to support said crosspin to prevent any appreciable movement of the apertured members away from each other.

7. In a fastener device of the rotary operative type, a plurality of apertured members to be fastened together, a one-piece socket member adapted to be secured to one of said apertured members, said socket including a plate-like element having end portions and a connecting portion of reduced width intermediate said end portions, said connecting portion having a recess substantially in the center thereof and a fold intermediate said recess and one of said end portions whereby said end portion is foreshortened in the direction of said recess, and a spring element having its ends integrally joined to said end portions so as to be disposed laterally of said connecting portion, said spring element being disposed normally above the plane of said connecting portion and having a locking seat intermediate its ends, a rotary operative stud having a head bearing against the outer surface of one apertured member and a shank extending through all of said apertured members and said aperture of said plate element, a crosspin assembled with said shank, and a portion of said pin being adapted to interlock with said spring within said locking seat when said rotary member is turned to fastened position.

8. In a fastener device of the rotary operative type, a plurality of apertured members to be fastened together, a one-piece socket member adapted to be secured to one of said apertured members, said socket including a plate-like element having end portions and a connecting portion of reduced width intermediate said end portions, said connecting portion having a recess substantially in the center thereof and a fold on each side of said recess intermediate said recess and said respective end portion whereby said end portion is foreshortened in the direction of said recess, and a spring element on each side of said connecting portion, each of said spring elements having its ends integrally joined to said end portions, said spring elements being disposed above the plane of said connecting portion and each of said spring elements having a locking seat intermediate its ends, a rotary operative stud having a head bearing against the outer surface of one apertured member and a shank extending through all of said apertured members and said aperture of said plate element, a crosspin assembled with said shank, said pin having its ends adapted to interlock with said spring elements within said locking seats when said rotary member is turned to fastened position.

9. In a fastener device of the rotary operative type, a plurality of apertured members to be fastened, a rotary member adapted to be attached to one of said apertured members and pass through the apertures of all of said members, a lateral projection presented by said rotary member, a socket means secured to one of said other apertured members and having a spring portion cooperating with said lateral projection to cause said apertured members to be held tightly together and said socket means also including a substantially rigid element cooperating directly with said lateral projection to lock said apertured members against appreciable movement away from each other when the spring is in engagement with said lateral projection and said spring portion and rigid element being constructed to act independently of each other.

WALTER I. JONES.